Dec. 13, 1949  J. UNERTL ET AL  2,491,431
TELESCOPE MOUNTING

Filed Sept. 27, 1947  2 Sheets-Sheet 1

INVENTORS
John Unertl &
John Unertl, Jr.
BY
ATTORNEY

INVENTORS
John Unertl &
John Unertl, Jr.
BY
ATTORNEY

Patented Dec. 13, 1949

2,491,431

UNITED STATES PATENT OFFICE 2,491,431

TELESCOPE MOUNTING

John Unertl and John Unertl, Jr., Pittsburgh, Pa.

Application September 27, 1947, Serial No. 776,494

6 Claims. (Cl. 33—50)

The present invention relates to a mounting for telescopes of the type used in connection with small arms such as rifles.

It is customary in marksmanship practice to mount a telescope on the barrel of a rifle to increase the range of vision with respect to the target, and to provide such mounting with suitable adjustments to take care of windage and corrections in elevation according to the range.

It is an object of the present invention to provide an adjustable mount for a telescope which is compact in construction and renders lateral and vertical adjustments of the telescope precise and easily made.

Other objects of the invention will be apparent from the following description and accompanying drawings.

Figure 1:
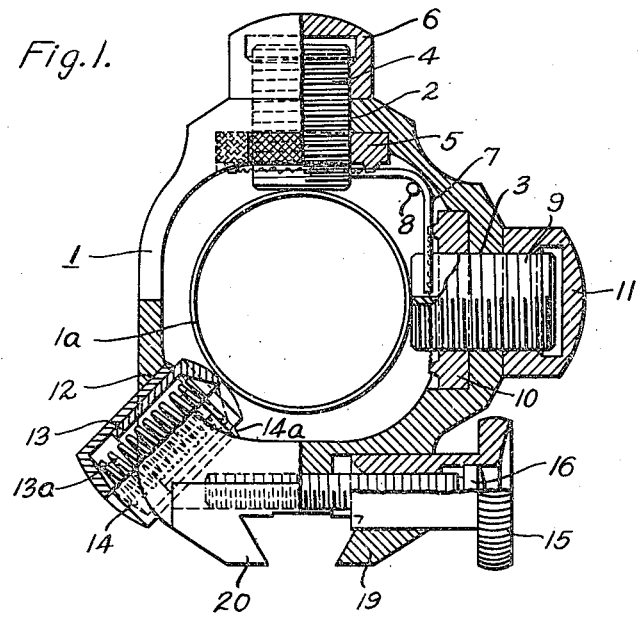
Figure 1 is a view in section of a telescope mount constructed in accordance with the invention.

Referring to the drawings, the body 1 of the telescope mount is provided with a large central aperture through which the body 1a of a telescope projects. The body 1 is provided with an upper aperture 2, as shown more clearly in Fig. 3, and a lateral aperture 3; the apertures 2 and 3 having their axes disposed at right angles, and both apertures having countersunk portions on the interior of the body 1 for accommodating the parts of the adjusting devices.

Figure 2:
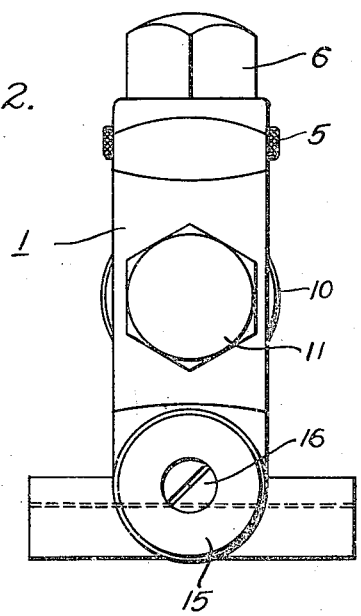
Fig. 2 is a view in lateral elevation of the mount shown in Fig. 1.
Figure 3:
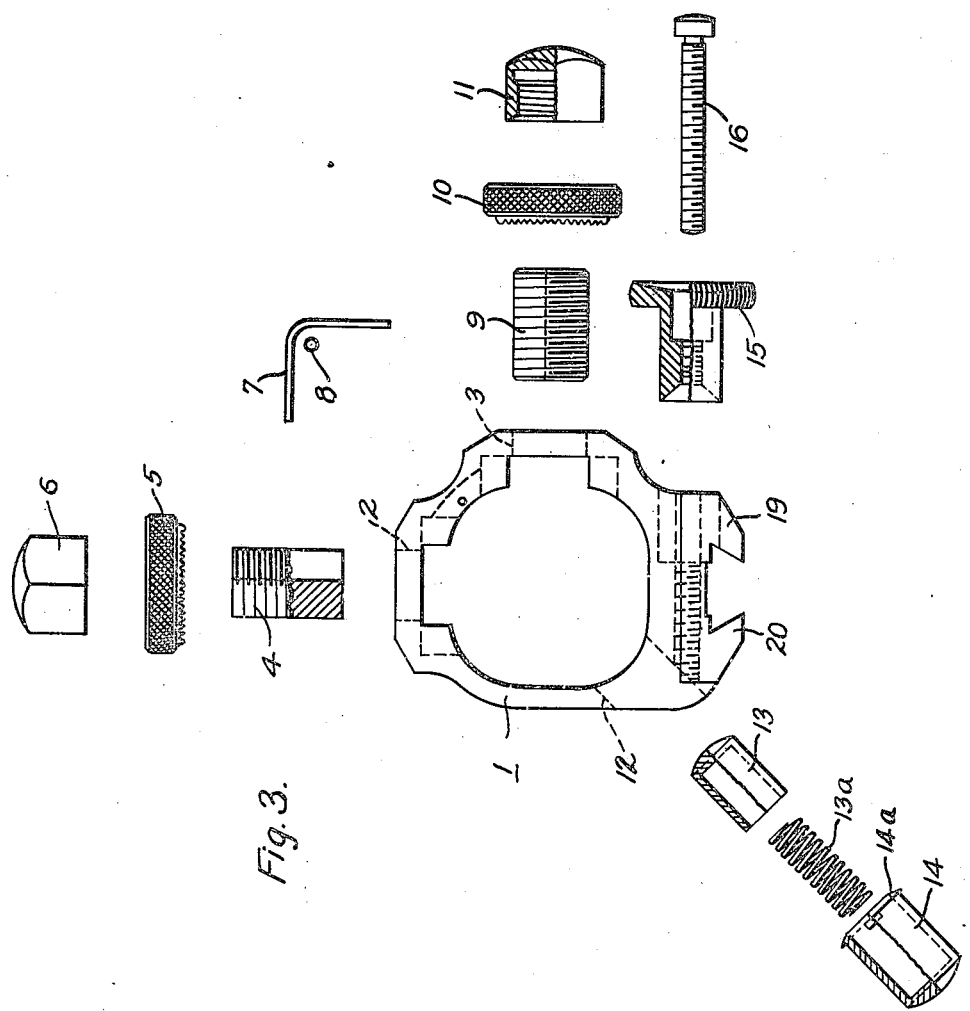
Fig. 3 is an exploded view partly in section of the assembly shown in Fig. 1.

Referring further to Fig. 3, a threaded section of a rod or bolt 4 is adapted to receive an interiorly threaded and knurled adjusting nut 5, and the two parts, when assembled, are inserted through the aperture 2 from within the body 1 so that the nut 5 rests within the countersunk portion of the recess and the end of the rod 4 projects through the aperture 2 for receiving a locking nut 6. By reference to Fig. 2, it will be noted that the edge of the adjusting knob 5 projects beyond the body 1 and may be manipulated manually. Similarly, the lateral aperture 3 is provided with a threaded rod 9 which cooperates with a knurled adjusting nut 10 and is secured in position by a locking nut 11.

When the parts thus far described are in position in the body of the mount, a spring 7 is inserted in a recess in the mount, and its free ends extend respectively into longitudinal slots cut in the bars 4 and 9. The spring is maintained in the recess by a pin 8. By this means a resilient bias is applied against the inner faces of the adjusting nuts 5 and 10 to retain the assembly in operative position before the clamping or locking nuts 6 and 11 are tightened. That is, when the parts are assembled as in Fig. 1, the adjusting nuts may be rotated respectively to change the position of the telescope body both vertically and horizontally. To facilitate such adjustment, the faces of the nuts 5 and 10 are provided with serrations which bear against the arms of the spring 7 so that upon rotation of such nuts, a sequence of "clicks" will be produced to give the marksman an indication of the proper degree of adjustment for the range and windage encountered. After such adjustment, the nuts 6 and 11 may be screwed down to maintain such adjustment.

It should be noted that the spring 7 serves a number of purposes. First, it maintains the rods 4 and 9 and their respective adjusting nuts 5 and 10, in operative position until the clamping nuts 6 and 11 are screwed down; second, it cooperates with the serrated faces of nuts 5 and 10 to provide a "click" device; and third, it prevents rotation of the rods 4 and 9 during the adjusting operation of the nuts 5 and 10.

The body 1 is also provided with an aperture 12, the axis of which extends on a line intersecting the axes of the apertures 2 and 3. A device for providing a spring bias against the telescope body, and the movement thereof imparted by adjusting nuts 5 and 10, comprises a pair of telescoping cup members 13 and 14 which house a resilient member such as a coiled compressed spring 13a. The assembled device is inserted into the position shown in Fig. 1 and the outer telescoping member 14 is secured in position with respect to the body of the mount in any desired mannner, as by an out-turned lip 14a on cup member 14. Accordingly, movement of the telescope itself both horizontally and vertically is resiliently restrained by the device 13—14.

The body 1 of the mount is also provided with a lower recess to accommodate a movable jaw 19 which cooperates with a stationary jaw 20 to clamp the mount against a suitable fitting on the rifle barrel adjacent the rear sight position of the rifle. Such clamp may be any of a number of types but a preferred embodiment includes a manually operative knob 15 having internal threads for receiving a screw 16 which, in turn, projects into a threaded aperture in the body of the mount.

In accordance with the invention, the structure described is unusually simple in construction and precise in its operation. A positive adjusting action is obtained and after the adjustment is made, the parts may be rigidly secured in position and not be affected by the ordinary use and manipulation of the rifle upon which the mounting device is secured.

We claim as our invention:

1. An adjustable mount for a telescope tube comprising, a body portion having an enlarged opening through which the telescope tube is to extend, a threaded rod extending through an aperture in one side of said body portion for reciprocation at right angles to the axis of the telescope tube, an adusting nut threaded on said rod and having one face bearing against an inner wall of said body portion about said aperture to adjustably limit outward movement of said rod, means for resiliently biasing said adjusting nut against said wall comprising an elongated spring member having a portion supported by said housing and a free end engaging the free face of said adjusting nut, and means for preventing rotation of said threaded rod in said aperture comprising a slot extending axially of said rod and proportioned to slidably receive said free end of the spring member.

2. An adjustable mount for a telescope tube comprising, a body portion having an enlarged opening through which the telescope tube is to extend, a threaded rod extending through an aperture in one side of said body portion for reciprocation at right angles to the axis of the telescope tube, an adjusting nut threaded on said rod and having one face bearing against an inner wall of said body portion about said aperture to adjustably limit outward movement of said rod, means for resiliently biasing said adjusting nut against said wall comprising an elongated spring member having a portion supported by said housing and a free end engaging the free face of said adjusting nut, means for preventing rotation of said threaded rod in said aperture comprising a slot extending axially of said rod and proportioned to slidably receive said free end of the spring member, and a series of serrations on said free face of said nut in position to engage successively the free end upon rotation of said adjusting nut.

3. An adjustable mount for a telescope tube comprising, a body portion having an enlarged opening through which the telescope tube is to extend, a threaded rod extending through an aperture in one side of said body portion for reciprocation at right angles to the axis of the telescope tube, an adjusting nut threaded on said rod and having one face bearing against an inner wall of said body portion about said aperture to adjustably limit outward movement of said rod, means for resiliently biasing said adjusting nut against said wall comprising an elongated spring member having a portion supported by said housing and a free end engaging the free face of said adjusting nut, a second threaded rod extending through a second aperture in said body portion, said apertures having axes displaced substantially 90° about the axis of the telescope tube position, a second adjusting nut threaded on said second rod and having a face bearing against the body wall about said second aperture, and a second free end of said spring member bearing against the free face of said second adjusting nut, each of said rods having means for slidably engaging the respective free ends of said spring member to prevent rotation of the rods upon manipulation of the adjusting nuts.

4. An adjustable mount for a telescope tube comprising, a body portion having an enlarged opening through which the telescope tube is to extend, a threaded rod extending through an aperture in one side of said body portion for reciprocation at right angles to the axis of the telescope tube, an adjusting nut threaded on said member and having one face bearing against an inner wall of said body portion about said aperture to adjustably limit outward movement of said rod, means for resiliently biasing said adjusting nut against said wall comprising an elongated spring member having a portion supported by said housing and a free end engaging the free face of said adjusting nut, a second threaded rod extending through a second aperture in said body portion, said apertures having axes displaced substantially 90° about the axis of the telescope tube position, a second adjusting nut threaded on said second rod and having a face bearing against the body wall about said second aperture, and a second free end of said spring member bearing against the free face of said second adjusting nut, each of said rods being slotted to slidably receive the respective free ends of said spring member to prevent rotation of the rods upon manipulation of the adjusting nuts and resilient means acting against said body portion to exert a bias against the telescope along a line intersecting the longitudinal axes of said rods.

5. An adjustable mount for a telescope tube comprising a body portion having an opening through which said tube is to extend, an aperture in said body extending at right angles to the bore of said opening and communicating therewith, a rod extending through said aperture for reciprocation at right angles to the longitudinal axis of the telescope tube, an adjustable nut threaded on said rod and having a portion thereof bearing against an inner wall of said body portion to limit the movement of said rod and nut in one direction, and means comprising a resilient member carried by said body portion for biasing said rod and adjustable nut in said one direction and engaging means on said rod to prevent rotation thereof.

6. An adjustable mount for a telescope tube comprising a body portion having an opening through which said tube is to extend, an aperture in said body extending at right angles to the bore of said opening and communicating therewith, a rod extending through said aperture for reciprocation at right angles to the longitudinal axis of the telescope tube, an adjustable nut threaded on said rod and having a portion thereof bearing against an inner wall of said body portion to limit the movement of said rod and nut in one direction, and resilient means for biasing said rod and adjusting nut toward said inner wall comprising a spring member having a portion fixed with respect to said wall, a portion resiliently engaging said adjustable nut, and a portion cooperating with means carried by said rod to prevent rotation thereof.

JOHN UNERTL.
JOHN UNERTL, Jr.

REFERENCES CITED

The following references are of record in the file of this patent:

UNITED STATES PATENTS

| Number | Name | Date |
|---|---|---|
| 1,376,992 | Amigues | May 3, 1921 |
| 1,386,027 | Reynolds | Aug. 2, 1921 |
| 1,438,694 | Burton | Dec. 12, 1922 |
| 2,045,670 | Noske | June 30, 1936 |
| 2,161,051 | Humeston | June 6, 1939 |
| 2,203,913 | Unertl | June 23, 1940 |